Figure 2:
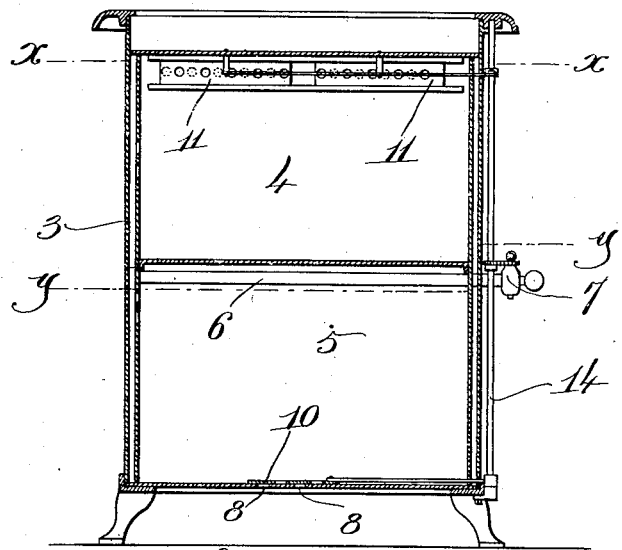

No. 884,300. PATENTED APR. 7, 1908.
W. K. STAFFORD.
HEATER.
APPLICATION FILED DEC. 5, 1904.
2 SHEETS—SHEET 1.
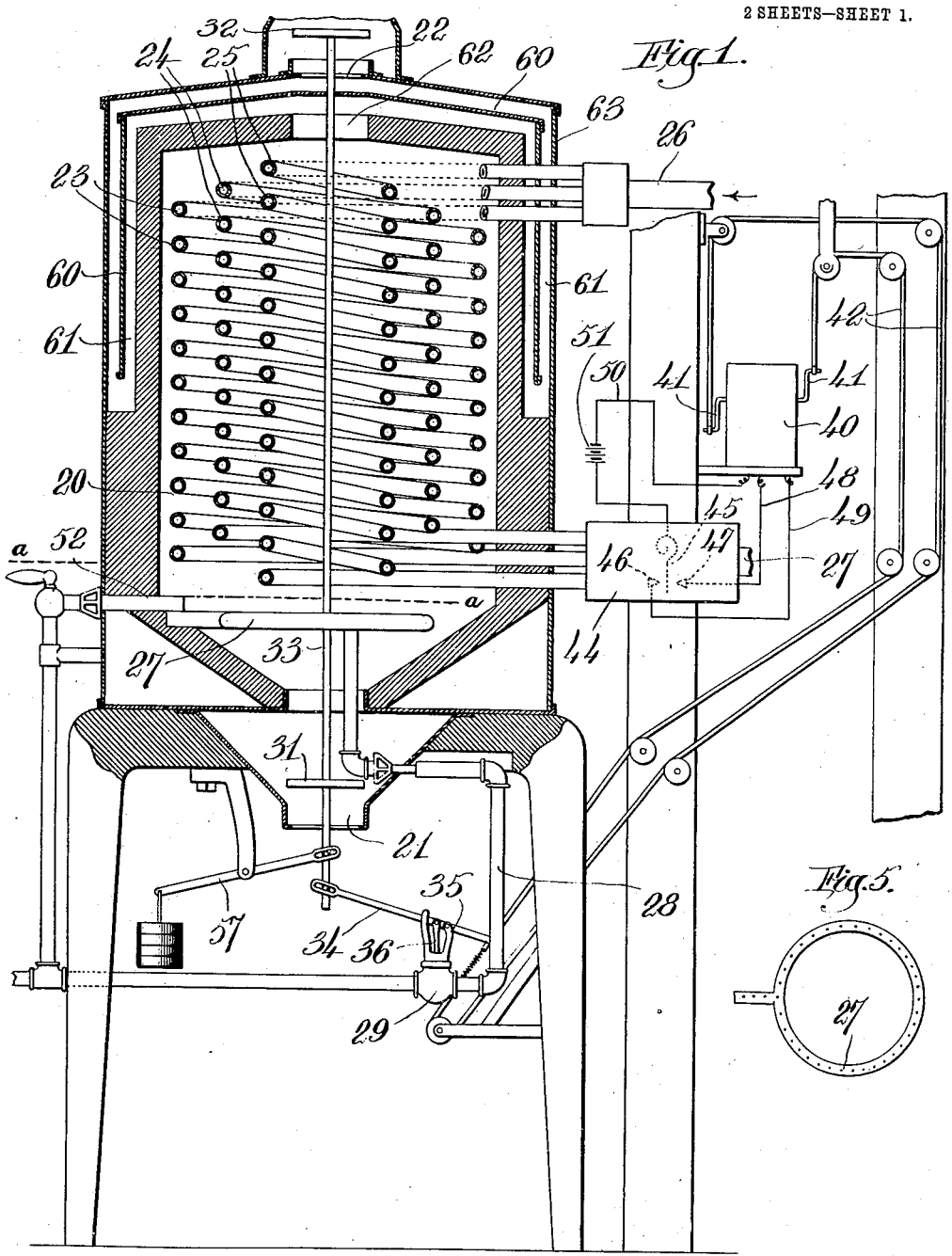
Fig. 1.
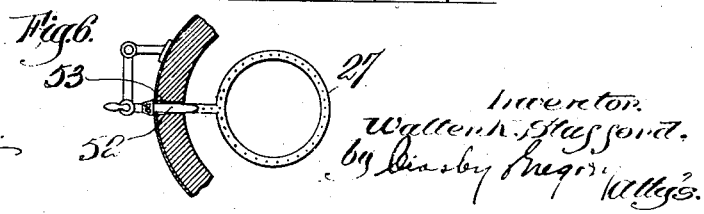
Fig. 5.
Fig. 6.
Witnesses.
Thomas J. Drummond
J. Wm. Lutton
Inventor.
Walter K. Stafford.
by Digby Negri
Attys.

No. 884,300. PATENTED APR. 7, 1908.
W. K. STAFFORD.
HEATER.
APPLICATION FILED DEC. 5, 1904.

2 SHEETS—SHEET 2.

Witnesses.
Thomas J. Drummond
S. Wm. Sutton

Inventor.
Walter K. Stafford,
by Crosby Gregory
Attys.

UNITED STATES PATENT OFFICE.

WALTER K. STAFFORD, OF NEWTON, MASSACHUSETTS.

HEATER.

No. 884,300.  Specification of Letters Patent.  Patented April 7, 1908.

Application filed December 5, 1904. Serial No. 235,439. REISSUED

To all whom it may concern:

Be it known that I, WALTER K. STAFFORD, a citizen of the United States, residing at Newton, in the county of Middlesex and State of Massachusetts, have invented an Improvement in Heaters, of which the following description, in connection with the accompanying drawings, is a specification, like letters on the drawings representing like parts.

This invention relates to heaters in which gas, oil or electricity is employed as the heat-generating element, and it has for its object to provide a heater of this class which is more economical in the use of fuel than heaters as ordinarily constructed.

In an ordinary gas range, for instance, the burner is usually placed beneath the oven, and the lower oven or chamber in which the burner is contained is open at its lower end to the air so that necessary air can pass into said chamber to support combustion. The hot products of combustion and heated air pass into the upper oven where the baking is done, and from said oven they escape through a suitable outlet opening. The inlet and outlet openings are always open, and the result is that whenever the burner is shut off the hot air within the oven rises and escapes through the outlet opening, and its place is taken by cool air which is admitted to the inlet opening. This current of air passing through the oven very soon cools it, and it is necessary, therefore, to keep more or less of a flame going all the time that the oven is to be kept hot.

A gas range with my present improvements applied thereto has means for closing either the inlet or the outlet openings or both whenever the burner is shut off, thus preventing the heated air therein from escaping.

With my improvements applied to a gas range the oven may be heated sufficiently for baking purposes, and after the articles in the oven are partially baked the burner may be shut off, and either the inlet opening, or the outlet opening, or both openings closed, thereby retaining within the oven the heated air therein. Since this heated air cannot escape the oven will retain its baking temperature sufficiently long to finish the baking without the use of any further gas. A material saving in the amount of gas used is thus effected.

I have referred to a gas stove above merely to illustrate the principle on which my invention operates. The invention, however, is not limited in its use to gas ranges, as it may be embodied in any furnace or heater where gas, oil or electricity is used as the fuel.

Where the invention is embodied in a water-heater the heating-coils are placed in a heating-chamber which is heated by the burner, and said chamber will be provided with inlet and outlet openings which are normally open while the burner is in operation, fresh air being admitted to the inlet opening to support combustion, and the heated air and products of combustion escaping through the outlet opening after having heated the heating-coils. When the water in the coils is sufficiently hot the burner may be shut off and either the inlet opening or the outlet opening or both openings closed, thereby retaining in the heating chamber the heated air, which heated air contains sufficient heat to maintain the coils at the desired temperature for a considerable length of time without the use of any further fuel.

The above described embodiments of my invention are sufficient to illustrate its principle of operation, although it is not limited by any means to gas ranges or water heaters, but is adapted for use in connection with any heater.

Figure 3:
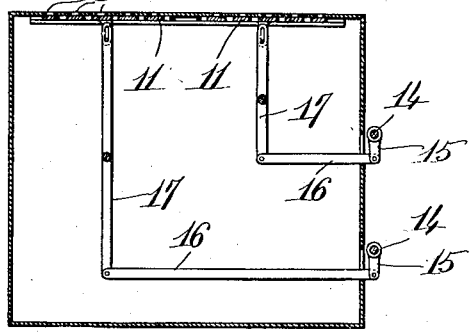
Figure 4:
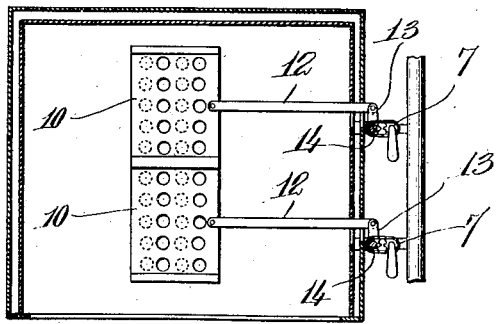

In the drawings, Figure 1 is a vertical section through a water-heater embodying my invention; Figs. 2, 3 and 4 illustrate a gas-range embodying my invention, Fig. 2 being a vertical section through such a gas-range; Fig. 3 being a section on the line $x$—$x$, Fig. 2; and Fig. 4 a section on the line $y$—$y$, Fig. 2; Fig. 5 is a plan view of the burner used in the water-heater; Fig. 6 is a fragmentary view on a reduced scale on line $a$—$a$, Fig. 1.

Referring first to the embodiment of my invention illustrated in Figs. 2, 3 and 4, 3 designates a gas-range of any suitable or usual construction, said range having the usual upper oven 4 in which the baking is done and the lower oven 5 in which the burners 6 are located. Said burners are controlled by the usual valves 7.

The bottom of the lower oven is provided with a suitable inlet opening 8 through which air enters to support combustion when the burners are in operation, and the upper oven is provided with an outlet opening or openings 9 through which the heated products of combustion and air escape all as usual in gas-ranges.

In applying my improvements to this type of gas-range I provide a valve or valves 10 for closing the inlet opening or openings, and other valves 11 for closing the outlet openings, and preferably said valves will be connected to the burner valve 7 for simultaneous operation therewith, whereby when the gas is turned on to the burner the inlet and outlet openings are opened, while when the gas is turned off said openings are both closed. These valves 10 and 11 may have any suitable construction and may be connected to the burner valves 7 in any appropriate way. I have herein illustrated said valves as slide valves with perforations which are adapted to register with the openings 8 and 9 respectively. Two valves 10 are shown, each one being connected to one of the burner valves 7. The invention would not be departed from, however, if a single valve controlled all the outlet openings.

In the embodiment of the invention herein illustrated each valve 10 is connected by a suitable link 12 with an arm 13 on a vertical rock-shaft 14, and said rock-shaft is connected by suitable mechanism, say a sprocket and chain gearing, with the corresponding valve 7, so that the turning of the valve to open or close it rocks the shaft 14 and thereby gives movement to the valve 10. I have also illustrated two valves 11 for controlling the outlet opening, and each valve is connected to the corresponding rock-shaft 14. For this purpose each rock-shaft 14 has an arm 15 thereon which is connected by a link 16 with a lever 17, which, in turn, is connected to the valve 11.

It will be readily seen that with the construction just described the turning of either valve 7 to open position will open the corresponding valves 10 and 11, while the turning of the valve 7 to closed position will close the corresponding valves 10 and 11. The result is that whenever the gas is turned onto the burners of the gas range the inlet and outlet openings are opened, while when the gas is turned off said openings are closed.

The closing of the openings prevents the current of air from passing through the oven and thus rapidly cooling it, and the result is that after any articles in the oven are partially baked the gas may be completely shut off from the burners and the baking finished by the heat which is retained in the oven, thus making a material saving in the amount of gas used. Where two burner valves 7 are used I prefer to make the valves 10 and 11 in sections, as shown so that only a portion of the inlet and outlet openings are opened when one burner valve only is open. In this way the amount of air admitted to the burners may be regulated according to the number of burners in use.

In Fig. 1 I have shown another embodiment of my invention, wherein my improvements are used in connection with a hot-water heater. In said embodiment 20 designates a heating chamber in which are placed heating coils. Said chamber has an inlet opening 21 through which fresh air is admitted to the chamber, and an outlet opening 22 through which the heated air and products of combustion escape.

I have shown the heating coils within the chamber as arranged in three series, but this arrangement is not essential to the invention, as any arrangement of coils may be adopted. The three series of coils are designated by 23, 24, 25, respectively, the coils 25 being inclosed within the coils 23 and 24, and the coils 23 surrounding the other two series of coils. All the coils are connected at one end to an inlet pipe 26 and at the other end to an outlet pipe 27. Where this device is to be used in connection with a house heating system the pipe 27 will lead the heated water to the radiators and the return from the radiators will be taken to the inlet pipe 26. The burner for heating the chamber may be of any suitable or usual type, and is designated by 27. This burner is supplied with gas or other suitable fuel through a suitable gas pipe 28, which pipe is provided with a valve 29 for admitting gas to the burner or shutting it off therefrom.

The inlet and outlet openings are controlled by valves 31 and 32 respectively, said valves being shown as open in Fig. 1. I prefer to connect the valves together for simultaneous operation, they being herein illustrated as so connected by means of a suitable valve stem or connecting rod 33 which extends up through the heating chamber. The two valves 31 and 32 are also preferably connected to the valve 29 so that all three valves work simultaneously. This connection may be made by means of a suitable lever 34 which is pivoted on any suitable fixed support, as an arm 35 of the valve 29, and which is pivotally connected both to the valve stem 36 of the gas valve 29 and the valve-stem 33. When these valves are in the position shown in Fig. 1 the gas valve 29 is open and gas is admitted to the burner 27 and the inlet and outlet valves also open so that air can be admitted to the chamber to support combustion and the heated air and products of combustion may escape from the chamber. The closing of the gas valve 29 closes both the inlet and outlet valves thereby sealing up the heating chamber and preventing the heated air therein from escaping.

In the operation of the device after the water in the coils has been sufficiently heated the valves are all closed, and the heat which is retained in said chamber is sufficient to keep the water in the coils at approximately the desired temperature for a considerable length of time.

The valves may be operated either by hand or automatically.

Where the device is used in connection with a hot-water heating system, as shown in Fig. 1, it is feasible to use some suitable automatic means for controlling the valve, such as a thermostat or clock mechanism. I have illustrated a thermostat in the drawings.

Any suitable or usual thermostat may be employed for this purpose, that herein illustrated being the one known to the trade as the "Minneapolis" thermostat. This thermostat comprises a spring-motor 40 having oppositely disposed cranks 41 which are connected by means of suitable flexible connections 42, to one end of the lever 34. The motor is arranged so that at each operation it makes a half revolution, the first half revolution resulting in moving the lever 34 in one direction, and the second half revolution resulting in moving it in the opposite direction.

The motor is controlled by means of any suitable thermostat, which, in this embodiment of my invention, is preferably a submerged thermostat, that is, a thermostat contained within a header or chamber 44 in the outlet pipe 27. Said thermostat is illustrated diagrammatically by dotted lines 45, and is arranged to engage either of the contacts 46 or 47 according to the temperature of the water in the chamber. These contacts are connected by wires 48 and 49 with the release mechanism of the motor, and the thermostat 45 is connected with the motor by another wire 50 which has a suitable battery or generator 51 therein.

The thermostat is so arranged that when the water reaches the desired temperature the said thermostat engages the contact 47 and this completes the circuit and sets the motor in operation. The cranks of the motor will then make a half rotation from the position shown in Fig. 1, with the result that the lever 34 is moved and the gas valve and inlet and outlet valves are closed; the burner then goes out and the heat retained in the heating chamber maintains the water in the coils at the desired temperature for a considerable length of time. When the water cools the thermostat engages the contact 46, thus completing the circuit through the wire 49 and releasing the motor so that it will return to the position shown in Fig. 1, thereby opening all the valves. For lighting the burner 27 again when the valves are open I prefer to have a pilot burner 52 which will be in operation all the time and is capable of being moved into and out of an aperture 53 in the side of the heating chamber.

The valve stem 33 is preferably counterweighted by a suitable counterweight 57. In order to retain the heat in the heating chamber somewhat longer when the inlet and outlet valves are both open I have shown a hood 60 which sets over the upper end of the chamber and occupies an annular space 61 in the top of the walls of the chamber. The roof of the heating chamber is provided with an opening 62 through which the heated products of combustion pass into the space beneath the hood, and the hood deflects said products of combustion downward into the space 61 where they pass around the bottom of the hood. From the space between the hood and the outer casing 63 the products of combustion pass through the outlet opening 22.

It is not essential to my invention that valves be provided for closing both the inlet and outlet openings, for it will be obvious that by closing either one of said openings only the heated air will be retained in the chamber much longer than if both openings were open, and therefore I intend this patent to cover a heater whether one of said openings only or both are controlled by valves. It will also be obvious that with appropriate modifications the principle of my invention can be applied to any furnace or heater whether it is heated by gas, oil or electricity.

I would state therefore that my invention covers any heater or furnace having a heating chamber and inlet and outlet openings, means to heat said chamber, and means to close either one of said openings or both of them when said means is not in operation.

Having described my invention what I claim as new and desire to secure by Letters Patent is:—

1. A heating chamber having an inlet opening for the admission of air and an outlet opening for the exit of the products of combustion, a valve for each of said openings a burner for heating said chamber, a valve for controlling the fuel supply to said burner, means for operatively connecting said fuel supply valve and the valves controlling the aforesaid inlet and outlet openings whereby, when the fuel supply valve is closed or opened all valves connected therewith are simultaneously and automatically closed or opened, allowing the heating chamber to be completely closed automatically by the closing of the fuel supply valve.

2. A heating chamber having an inlet opening for the admission of air and an outlet opening for the exit of the products of combustion, a valve for each of said openings a burner for heating said chamber, a valve for controlling the fuel supply to said burner, means for operatively connecting said fuel supply valve and the valves controlling the aforesaid inlet and outlet openings whereby, when the fuel supply valve is closed or opened, all valves connected therewith are simultaneously and automatically closed or opened, allowing the heating chamber to be completely closed automatically by the closing of the fuel supply valve, and a thermostat for automatically controlling the fuel supply valve.

In testimony whereof, I have signed my name to this specification, in the presence of two subscribing witnesses.

WALTER K. STAFFORD.

Witnesses:
LOUIS C. SMITH,
MARGARET A. DUNN.